United States Patent [19]

Attix

[11] Patent Number: 5,711,629
[45] Date of Patent: Jan. 27, 1998

[54] RECONSTITUTABLE ROD CLUSTER CONTROL ASSEMBLY WITH BIASED DRIVER

[75] Inventor: Douglas J. Attix, Lynchburg, Va.

[73] Assignee: Framatome Cogema Fuels, Lynchburg, Va.

[21] Appl. No.: 583,931

[22] Filed: Jan. 11, 1996

[51] Int. Cl.$^6$ ................................................ F16B 39/00
[52] U.S. Cl. .................... 403/320; 403/24; 403/DIG. 3; 376/224
[58] Field of Search ............................ 403/24, 320, 315, 403/316, 317, 318, 319, 327, DIG. 3, 2; 376/224, 233, 327

[56] References Cited

U.S. PATENT DOCUMENTS

| | | | |
|---|---|---|---|
| 1,717,186 | 6/1929 | Cargle | 403/320 X |
| 2,300,711 | 11/1942 | Staerker | 403/2 |
| 2,671,682 | 3/1954 | Page. | |
| 2,894,779 | 7/1959 | Kushner et al. | 376/233 X |
| 2,992,788 | 7/1961 | Hardison | 403/319 X |
| 3,317,225 | 5/1967 | Cooper | 403/24 |
| 3,930,938 | 1/1976 | Berglund et al. | 376/224 |
| 4,147,589 | 4/1979 | Roman et al. . | |
| 4,292,131 | 9/1981 | Suzuki . | |
| 4,481,164 | 11/1984 | Bollinger . | |
| 4,711,756 | 12/1987 | Nakazato | 376/233 X |
| 4,752,434 | 6/1988 | Savary . | |
| 4,753,769 | 6/1988 | Savary . | |
| 4,755,346 | 7/1988 | Savary . | |
| 4,778,645 | 10/1988 | Altman et al. . | |
| 4,855,100 | 8/1989 | Shallenberger et al. | 376/327 |
| 4,885,123 | 12/1989 | Ikeuchi et al. . | |
| 4,928,291 | 5/1990 | Mouesca et al. | 376/327 |
| 5,110,535 | 5/1992 | Dillmann . | |
| 5,141,711 | 8/1992 | Gjertsen et al. . | |
| 5,183,626 | 2/1993 | Denizou . | |
| 5,331,675 | 7/1994 | Hosoya et al. . | |

*Primary Examiner*—Harry C. Kim
*Attorney, Agent, or Firm*—Rhodes Coats & Bennett, L.L.P.

[57] ABSTRACT

The present invention is directed to a rod connector assembly for removably securing a control rod to a spider structure. The rod connector assembly includes a tubular boss fixedly secured to the spider structure and a mounting assembly which includes a receiving structure and a biasing structure. The assembly also includes a cap having a cavity formed therein, the biasing structure including a driver and disposed in the cavity such that the driver extends outwardly from the cavity and into the boss, and wherein the cap is secured to the boss. When the control rod is in a prescribed position with respect to the boss, the mounting assembly is operative to resist rotation of the control rod upon application to the control rod of an amount of torque less than a predetermined amount of torque.

21 Claims, 2 Drawing Sheets

5,711,629

1

RECONSTITUTABLE ROD CLUSTER CONTROL ASSEMBLY WITH BIASED DRIVER

BACKGROUND OF THE INVENTION

1. Field of the Invention

The present invention relates generally to rod cluster control assemblies and, more particularly, to a reconstitutable rod cluster control assembly providing for selective removal and replacement of control rods.

2. Description of the Prior Art

In a typical reactor core, such as a pressurized water-type reactor, the reactor core includes a multiplicity of fuel assemblies. The nuclear fission rate, and thus the rate of heat generation, in the core is controlled by varying the neutron flux of the core. The level of neutron flux and thus the heat output of the core is normally regulated by selective movement of control rods containing neutron absorbing material into and out of the core.

A conventional method for manipulating the control rods with respect to the core is to employ a rod cluster control assembly (RCCA). The RCCA typically comprises a control rod spider assembly which includes a plurality of control rods and a spider structure supporting the control rods at their upper ends. The spider structure, in turn, is connected to a control drive mechanism that vertically raises and lowers the control rods into and out of hollow guide tubes forming a part of fuel assemblies. A typical construction of the control rod used in such an arrangement is in the form of an elongated metallic cladding tube having a neutron absorbing material disposed within the tube and with end plugs at opposite ends thereof for sealing the absorber material within the tube.

The spider structure typically includes a plurality of radially extending vanes or fins supported on and circumferentially spaced about a central hub. The vanes are flat metal plates positioned on edge and connected by, for example, welds or brazements at their inner ends to the central hub. Cylindrical or tubular shaped control rod connecting fingers are mounted to and supported by the vanes, also by welds or brazements. Another spider structure includes a single-piece casting having a central hub with vanes or arms that support integrally cast bosses.

Typically, the upper end plug of each control rod has a threaded outer end which is screwed into the finger which includes a complementary interior threaded portion. Conventionally, the end plug is secured in engagement with the finger by a key or pin which is inserted through the side of the finger and into the end plug and welded in place. The key or pin serves to prohibit rotational movement of the plug with respect to the finger so that the control rod will not become unscrewed from the finger of the spider when in service.

A significant drawback of the conventional control rod spider assembly is that once it is assembled at a fabrication plant, it is not reconstitutable. That is, the assembly cannot readily be taken apart REMOTELY and worn or damaged components replaced at a reactor site. Instead, the whole assembly must be discarded. This is of particular concern in the case of older nuclear reactor plants or in nuclear plants whose design results in uneven or premature wear or failure of individual control rods. Accordingly, great time and expense may be saved by the provision of means for coupling a control rod to a spider, the means allowing for

2 convenient and secure removal and replacemet of a control rod REMOTELY at a reactor site.

Any means for coupling a control rod to a spider, reconstitutable or otherwise, must provide at least a minimum degree of security. In service, the control rods are subjected to substantial vibration and forces tending to separate the control rod from the spider. Accordingly, the provision of a threaded engagement between the control rod and the respective finger is not suitable for use in a nuclear reactor absent the provision of means to inhibit rotation of the control rod with respect to the finger.

U.S. Pat. No. 5,141,711 to Gjertsen et al. discloses a reconstitutable control assembly having removable control rods with detachable split upper end plugs. Multi-component locking features on the upper and lower plug portions lock them together so as to resist their unthreading from one another. However, the multiple components of the locking features disclosed in this patent are expensive. In addition, with this multi-component arrangement, straightness of the control rods can be degraded.

U.S. Pat. No. 5,183,626 to Denizou discloses an end part of a fuel rod which is integral with a ferrule. The ferrule is engaged when the rod is screwed into the bore. Deformation of the ferrule prevents rotation of the rod. The rod is demounted by exerting a torque on it. However, this design does not allow flexibility of the joint, which is necessary for proper performance in some reactors. In addition, this design could allow the joint to loosen during reactor operation and could permit straightness of the rods to be degraded.

Thus, there exists a need for a reconstitutable rod cluster control assembly which includes means for conveniently and securely removing and replacing control rods while, at the same time, will not loosen during ordinary usage.

SUMMARY OF THE INVENTION

The present invention is directed to a rod connector assembly for removably securing a control rod to a spider structure. The rod connector assembly includes a tubular finger or boss fixedly secured to the spider structure and a mounting assembly which includes a receiving structure and a biasing means.

The mounting assembly includes a first member adapted to be fixedly secured to the boss and a second member adapted to be fixedly secured to the control rod and including an externally threaded region. One of the first member and the second member includes a head having a receiving structure formed therein and the other of the first member and the second member includes a biasing means having an outwardly biased driver. When the first member is fixedly secured to the boss and the externally threaded region of the second member is engaged with the interior threads of the boss, the driver is disposed within the receiving structure and is thereby operative to resist rotation of the control rod.

The assembly also includes a cap having a cavity formed therein, the biasing means including a driver and disposed in the cavity such that the driver extends outwardly from the cavity and into the boss, and wherein the cap is secured to the boss.

When the control rod is in a prescribed position with respect to the boss, the mounting assembly is operative to resist rotation of the control rod upon application to the control rod of an amount of torque less than a predetermined amount of torque.

Accordingly, one aspect of the present invention is to provide a rod connector assembly for removably securing a

3 control rod to a spider structure. The rod connector assembly including: (a) a tubular boss fixedly secured to the spider structure, the boss including interior threads formed on an interior surface of the boss; (b) a mounting assembly including a receiving structure and a biasing means; and (c) wherein, when the control rod is in a prescribed position with respect to the boss, the mounting assembly is operative to resist rotation of the control rod upon application to the control rod of an amount of torque less than a predetermined amount of torque.

Another aspect of the present invention is to provide a mounting assembly for use in conjunction with a tubular boss having interior threads for removably securing a control rod to a spider structure. The mounting assembly including: (a) a first member adapted to be fixedly secured to the boss; (b) a second member adapted to be fixedly secured to the control rod and including an externally threaded region; (c) wherein one of the first member and the second member includes a head having a receiving structure formed therein; (d) wherein the other of the first member and the second member includes a biasing means and wherein the biasing means includes an outwardly biased driver; and (e) wherein, when the first member is fixedly secured to the boss and the externally threaded region of the second member is engaged with the interior threads of the boss, the driver is disposed within the receiving structure and is thereby operative to resist rotation of the control rod upon application to the control rod of an amount of torque less than an amount of torque sufficient to displace the driver out of the receiving structure.

Still another aspect of the present invention is to provide a rod connector assembly for removably securing a control rod to a spider structure. The rod connector assembly including: (a) a tubular boss fixedly secured to the spider structure, the boss including interior threads formed on an interior surface of the boss; (b) a mounting assembly including a receiving structure and a biasing means, the mounting assembly comprising: (i) a first member adapted to be fixedly secured to the boss; (ii) a second member adapted to be fixedly secured to the control rod and including an externally threaded region; (iii) wherein one of the first member and the second member includes a head having a receiving structure formed therein; (iv) wherein the other of the first member and the second member includes a biasing means and wherein the biasing means includes an outwardly biased driver; and (v) wherein, when the first member is fixedly secured to the boss and the externally threaded region of the second member is engaged with the interior threads of the boss, the driver is disposed within the receiving structure and is thereby operative to resist rotation of the control rod upon application to the control rod of an amount of torque less than an amount of torque sufficient to displace the driver out of the receiving structure; (c) a cap having a cavity formed therein, the biasing means including a driver and disposed in the cavity such that the driver extends outwardly from the cavity and into the boss, and wherein the cap is secured to the boss; and (d) wherein, when the control rod is in a prescribed position with respect to the boss, the mounting assembly is operative to resist rotation of the control rod upon application to the control rod of an amount of torque less than a predetermined amount of torque.

These and other aspects of the present invention will become apparent to those skilled in the art after a reading of the following description of the preferred embodiment when considered with the drawings.

4

Figure 2:
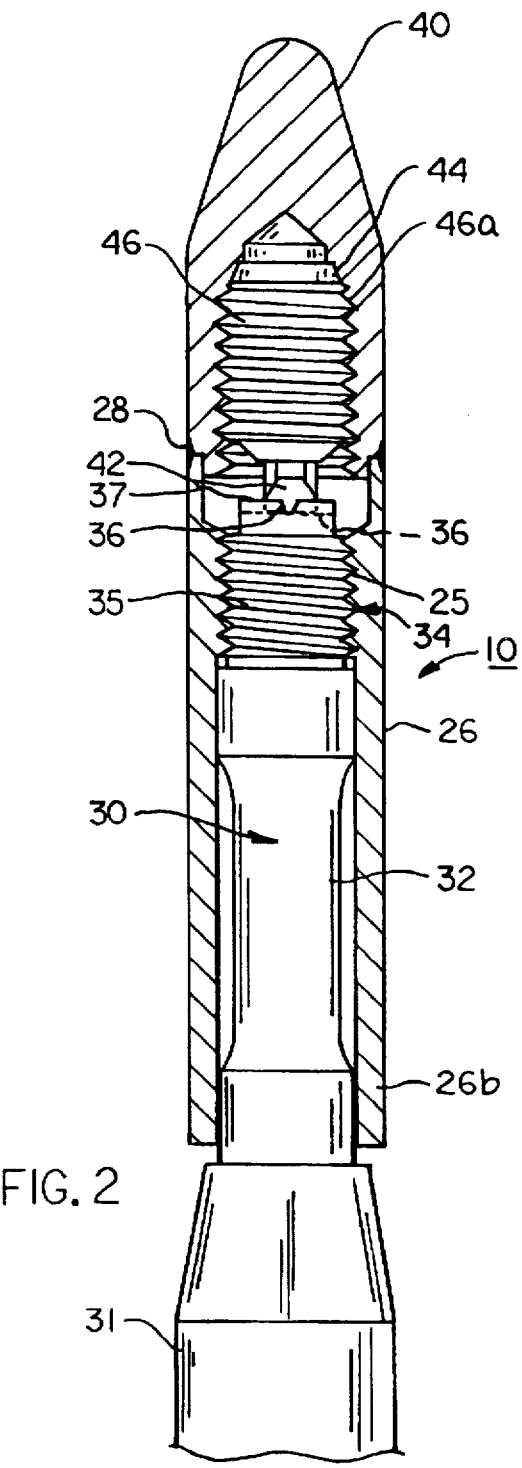
Figure 3:
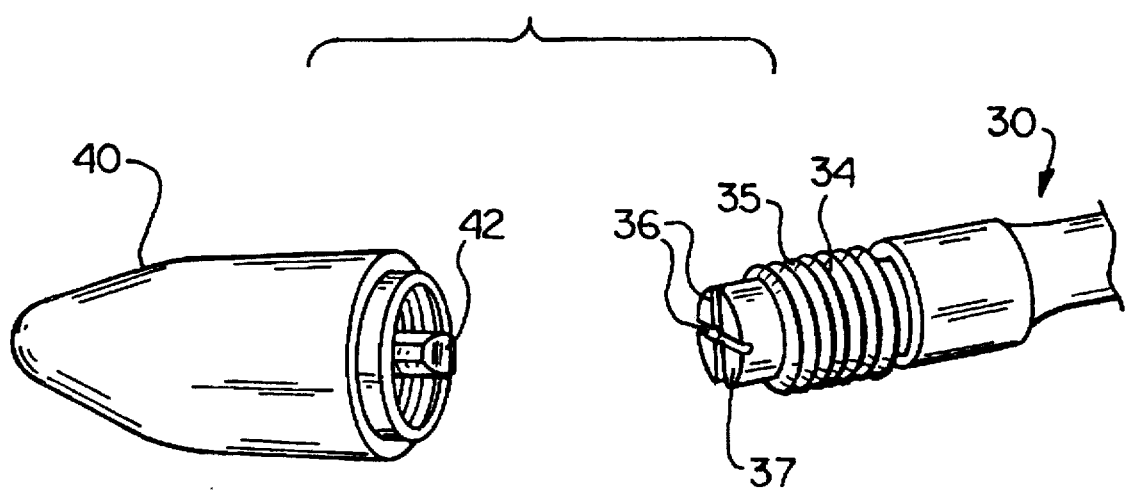
Figure 4:
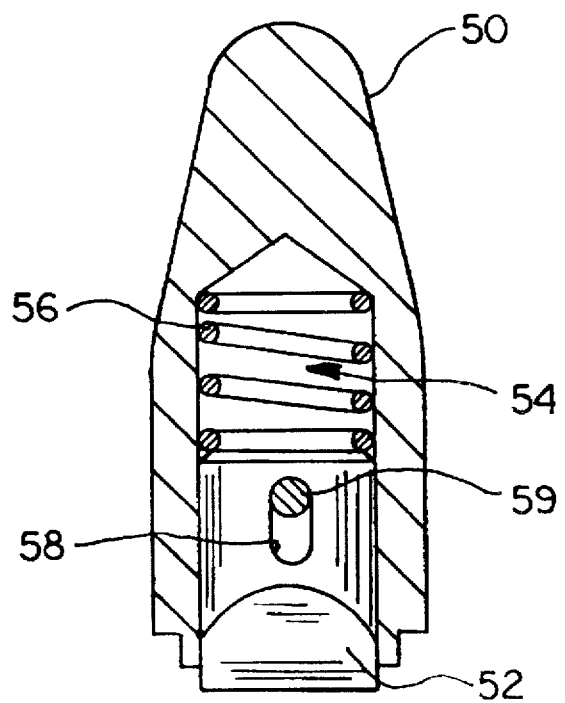

FIG. 2 is a cross-sectional, fragmentary view of the rod connector assembly of the present invention viewed along line 2—2;

FIG. 3 is an exploded, fragmentary, perspective view of the cap and coupling each forming a part of the rod connector assembly; and FIG. 4 is a cross-sectional view of a cap according to an alternative embodiment of the present invention.

DESCRIPTION OF THE PREFERRED EMBODIMENTS

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Figure 1:
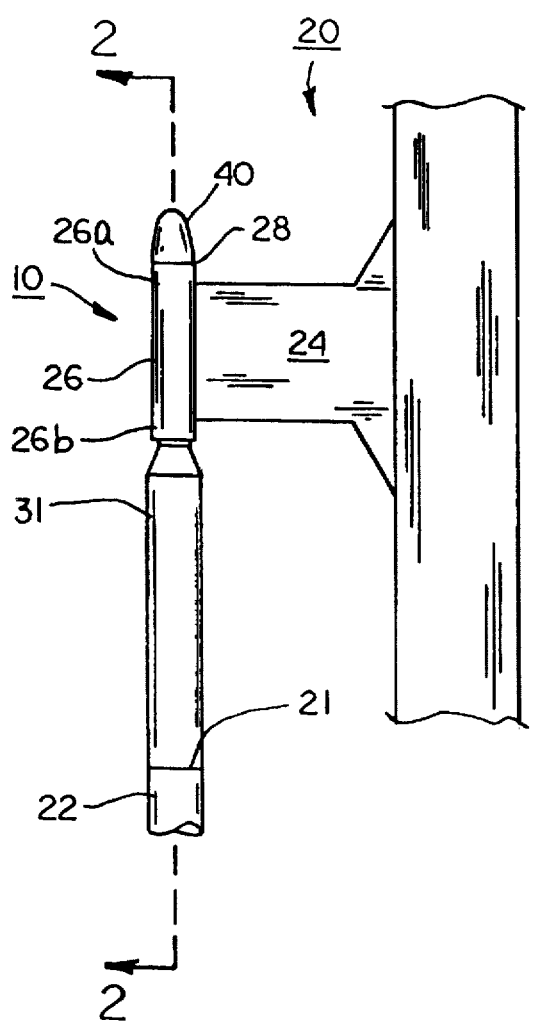
FIG. 1 is a fragmentary view of a rod cluster control assembly incorporating a rod connector assembly constructed according to the present invention.

Referring now to the drawings in general and FIG. 1 in particular, it will be understood that the illustrations are for the purpose of describing a preferred embodiment of the invention and are not intended to limit the invention thereto. As best seen in FIG. 1, a rod cluster control assembly (RCCA) 20 includes vane 24 from which control rod 22 depends. Control rod 22 is removably mounted on vane 24 by means of the rod connector assembly according to the present invention, generally denoted by the numeral 10. As best seen in FIG. 2, rod connector assembly 10 comprises boss 26, cap 40 and coupling 30.

Boss 26 is fixedly secured to vane 24 by any conventional means. Boss 26 is preferably hollow and generally tubular, including upper end 26a and lower end 26b. Interiorly threaded portion 25 is provided proximate upper end 26a.

Coupling 30 includes intermediate shaft 32. Plug 31 and head 34 are formed on opposite ends of shaft 32. Plug 31 is integrally joined to control rod 22, such as by weld 21. Head 34 is adapted to threadedly engage threaded portion 25 with threads 35. Slots 36 are formed in the upper face 37 of head 34.

Cap 40 is secured to the upper end 26a of boss 26 by weld 28. Alternatively, cap 40 may be integrally formed with boss 26. Cap 40 has threaded cavity 44 formed therein. Spring-loaded plunger unit 46, which has a casing with external threads 46a thereabout, is threadedly mounted in cavity 44. Driver 42, which forms a part of plunger unit 46, extends outwardly from cap 40 and into boss 26. Suitable spring-loaded plunger units are commercially available with the end of the driver 42 modified to a suitable shape for interface with slots 36, as described below.

When rod connector assembly 10 is in a mounted position as shown in FIG. 2 threads 35 of coupling 30 are engaged with threaded region 25 of boss 26, thereby prohibiting vertical movement of control rod 22. A portion of the blade of driver 42 is disposed within one of slots 36. Plunger unit 46 is designed such that driver 42 is prohibited from rotational movement about its axis. Rotational movement of threads 35 with respect to threaded region 25 is prohibited by the interface of the rotationally fixed driver 42 and the slot 36. The plunger unit 46 is welded, pinned, glued or otherwise secured from rotation within the cavity 44. The driver 42 preferably has a polygonal cross section and slides in out of a correspondingly polygonal opening in the plunger unit 46 so that the driver 42 will not rotate relative to the plunger unit 46. Control rod 22 may only be rotated with respect to the boss by applying an amount of torque sufficient to force the driver 42 up and out of the slot 36. Because control rod 22 is restrained from rotation upon application of less than a prescribed amount of torque, vibration and other small forces will not cause rotation of the coupling with respect to the boss, thereby insuring the security of the threaded engagement.

Control rod 22 may be mounted on vane 24 and removed from vane 24 by the following method: Cap 40 is welded onto, integrally formed with, or otherwise secured to boss 26 such that driver 42 is disposed in the upper end of the boss. Plug 31 is fixedly secured to the upper end of control rod 22. Coupling 30 is inserted into boss 26 through the lower end 26b thereof. Once threads 35 of head 34 engage threaded portion 25, control rod 22 or shaft 32 is rotated to engage threads 25 and 35.

As coupling 30 moves up into boss 26, the blade of driver 42 is received within driver 42 as 36. The blade of driver 42 and the side walls of slots 36 are preferably shaped such that a camming effect is obtained. That is, upon application of an amount of torque about the longitudinal axis of control rod 22 sufficient to overcome the downward bias of spring-loaded plunger unit 46 and the frictional resistance between driver 42 and the walls of slots 36, driver 42 will be displaced upwardly and out of the respective slot 36. As rotation is continued, driver 42 will slide along face 37 and resettle into another slot 36. This will continue until threads 35 and threaded portion 25 are relatively disposed as desired. It will be appreciated that, when coupling 30 is in this position, driver 42 will be disposed within a slot 36 and will be biased into the slot. Hence, a prescribed degree of torque will be required to overcome the restrictive force of plunger unit 46.

When it is desired to remove control rod 22 from boss 26, an amount of torque sufficient to overcome the bias of spring-loaded plunger unit 46 and the frictional engagement of driver 42 and slot 36 is applied. As control rod 22 is rotated within boss 26, the blade of driver 42 will travel in and out of slots 36. Ultimately, driver 42 will be fully extended and free of slots 36 and head 34 will be free of threaded portion 25, allowing control rod 22 to be removed from boss 26.

Notably, coupling 30, boss 26, and cap 40 are not damaged by the process of installing and removing control rod 22. A replacement rod with a coupling may be installed in boss 26 and using cap 40 without requiring any repair or resetting of these components.

An alternative embodiment of a cap suitable for use with boss 26 and coupling 30 is shown in FIG. 4. Cap 50 includes straight-walled cavity 54 formed therein. Driver 52 is partially disposed within cavity 54 such that, when cap 50 is mounted on boss 26, the bladed end of driver 52 extends into the upper end 26a of boss 26. Driver 52 is biased into boss 26 by spring 56. The displacement of driver 52 out of cavity 54 is limited by slot 58 formed in driver 52 and transverse pin 59 which is fixedly secured to the side wall of cavity 54. The pin 59 also prevents the blade or driver 52 from rotating.

The rod connector assembly of the present invention achieves several advantages over prior art control rod connecting structures. First, the present invention permits simple and inexpensive reconstitutability of control rods in a rod cluster control assembly. Although control rods may be replaced on spiders REMOTELY at reactor sites without the need to replace the entire spider, the rods retain "flex joint" features yet will not loosen during operation of the reactor. In addition, if wear is experienced on only one side of a control rod, the rod can be rotated 90 or 180 degrees to compensate for such wear.

Certain modifications and improvements will occur to those skilled in the art upon a reading of the foregoing description. By way of example, the plunger means could be mounted in the head of the coupling with the slots formed in the cap. Moreover, the slot could be found in the driver with a complementary projection provided on the abutting face. Also, the driver could have two blades at right angles in a cross-shape or other configuration as required. Biasing force of the spring loaded plunger could vary, changing the torque required to change positions of the driver blade in the slots.

It should be understood that all such modifications and improvements have been deleted herein for the sake of conciseness and readability but are properly within the scope of the following claims.

I claim:

1. A rod connector assembly for removably securing a control rod to a spider structure, said rod connector assembly comprising:
   (a) a tubular boss fixedly securable to the spider structure, said boss including interior threads formed on an interior surface of said boss;
   (b) a mounting assembly including a receiving structure and a biasing means, wherein said mounting assembly includes a cap having a cavity formed therein, said biasing means including a driver and disposed in said cavity such that said driver extends outwardly from said cavity and into said boss, and wherein said cap is secured to said boss; and
   (c) wherein, when said control rod is in a prescribed position with respect to said boss, said mounting assembly is operative to resist rotation of the control rod upon application to the control rod of an amount of torque less than a predetermined amount of torque.

2. The assembly according to claim 1 wherein said biasing means includes plunger means, said plunger means including said driver and a spring member operative to bias said driver outwardly from said cavity.

3. The assembly according to claim 2 further including interior threads formed in said cavity and wherein said plunger means includes a casing having external threads formed thereabout, said external threads of said plunger means adapted to engage said interior threads of said cavity.

4. The assembly according to claim 2 wherein said spring member is disposed within said cavity and wherein said driver is restricted from exiting said cavity by the engagement of a retaining structure formed in said driver and a pin member secured to said cap.

5. The assembly according to claim 1 wherein said mounting assembly includes a shaft having a first end and a second end and an externally threaded region formed about said second end.

6. The assembly according to claim 5 further including a plug formed on said first end of said shaft, said plug adapted to be fixedly secured to the control rod.

7. The assembly according to claim 5 wherein said receiving structure includes a slot formed on said second end of said shaft.

8. A mounting assembly for use in conjunction with a tubular boss having interior threads for removably securing a control rod to a spider structure, said mounting assembly comprising:
   (a) a first member adapted to be fixedly securable to said boss;
   (b) a second member adapted to be fixedly securable to the control rod and including an externally threaded region;
   (c) wherein one of said first member and said second member includes a head having a receiving structure formed therein;

(d) wherein the other of said first member and said second member includes a biasing means and wherein said biasing means includes an outwardly biased driver, wherein said head having said receiving structure formed therein includes a cap having a cavity formed therein, said biasing means disposed in said cavity such that said driver extends outwardly from said cavity and into the boss, and wherein said cap is adapted to be secured to the boss; and (e) wherein, when said first member is fixedly secured to the boss and said externally threaded region of said second member is engaged with the interior threads of the boss, said driver is disposed within said receiving structure and is thereby operative to resist rotation of the control rod upon application to the control rod of an amount of torque less than an amount of torque sufficient to displace said driver out of said receiving structure.

9. The assembly according to claim 8 wherein said biasing means includes plunger means, said plunger means including said driver and a spring member operative to bias said driver outwardly from said cavity.

10. The assembly according to claim 9 further including interior threads formed in said cavity and wherein said plunger means includes a casing having external threads formed thereabout, said external threads of said plunger means adapted to engage said interior threads of said cavity.

11. The assembly according to claim 9 wherein said spring member is disposed within said cavity and wherein said driver is restricted from exiting said cavity by the engagement of a retaining structure formed in said driver and a pin member secured to said cap.

12. The assembly according to claim 8 wherein said second member includes a shaft having a first end and a second end and said externally threaded region is formed about said second end.

13. The assembly according to claim 12 further including a plug formed on said first end of said shaft, said plug adapted to be fixedly secured to the control rod.

14. The assembly according to claim 12 wherein said receiving structure includes a slot formed on said second end of said shaft.

15. A rod connector assembly for removably securing a control rod to a spider structure, said rod connector assembly comprising:

(a) a tubular boss fixedly securable to the spider structure, said boss including interior threads formed on an interior surface of said boss; and (b) a mounting assembly including: (i) a first member including a cap having a cavity formed therein and a biasing means, said biasing means including an outwardly disposed driver in said cavity such that said driver extends outwardly from said cavity and into said boss, and wherein said cap is secured to said boss; (ii) a second member adapted to be fixedly securable to the control rod and including an externally threaded region, said second member including a head having a receiving structure formed therein; and (iv) wherein, when said first member is fixedly secured to the boss and said externally threaded region of said second member is engaged with the interior threads of the boss, said driver is disposed within said receiving structure and is thereby operative to resist rotation of the control rod upon application to the control rod of an amount of torque less than an amount of torque sufficient to displace said driver out of said receiving structure.

16. The assembly according to claim 15 wherein said biasing means includes plunger means, said plunger means including said driver and a spring member operative to bias said driver outwardly from said cavity.

17. The assembly according to claim 16 further including interior threads formed in said cavity and wherein said plunger means includes a casing having external threads formed thereabout, said external threads of said plunger means adapted to engage said interior threads of said cavity.

18. The assembly according to claim 16 wherein said spring member is disposed within said cavity and wherein said driver is restricted from exiting said cavity by the engagement of a retaining structure formed in said driver and a pin member secured to said cap.

19. The assembly according to claim 15 wherein said mounting assembly includes a shaft having a first end and a second end and said externally threaded region is formed about said second end.

20. The assembly according to claim 19 further including a plug formed on said first end of said shaft, said plug adapted to be fixedly secured to the control rod.

21. The assembly according to claim 19 wherein said receiving structure includes a slot formed on said second end of said shaft.

* * * * *